(12) United States Patent
Veselov et al.

(10) Patent No.: US 7,458,081 B2
(45) Date of Patent: Nov. 25, 2008

(54) CONFIGURABLE EVENT HANDLING FOR AN INTERACTIVE DESIGN ENVIRONMENT

(75) Inventors: Evgeny N. Veselov, Sammamish, WA (US); Alex Mogilevsky, Bellevue, WA (US); Mikhail Y. Arkhipov, Woodinville, WA (US); Mark Harper, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 884 days.

(21) Appl. No.: 10/918,170

(22) Filed: Aug. 13, 2004

(65) Prior Publication Data

US 2005/0022211 A1 Jan. 27, 2005

Related U.S. Application Data

(63) Continuation-in-part of application No. 10/400,366, filed on Mar. 27, 2003.

(51) Int. Cl.
*G06F 13/00* (2006.01)
(52) U.S. Cl. ............................ 719/318; 719/328
(58) Field of Classification Search ................ 719/318, 719/328
See application file for complete search history.

(56) References Cited

U.S. PATENT DOCUMENTS

| | | | |
|---|---|---|---|
| 5,694,610 A | 12/1997 | Habib et al. ................. 395/793 |
| 5,774,729 A * | 6/1998 | Carney et al. ................ 717/126 |
| 6,208,337 B1 | 3/2001 | Zimmerman et al. ......... 345/335 |
| 6,288,720 B1 | 9/2001 | Zimmerman et al. ......... 345/352 |
| 6,304,258 B1 | 10/2001 | Zimmerman et al. ......... 345/346 |
| 6,417,872 B2 | 7/2002 | Zimmerman et al. ......... 345/777 |
| 6,633,313 B1 * | 10/2003 | Cirne et al. .................. 715/744 |
| 2003/0018702 A1 * | 1/2003 | Broughton et al. ........... 709/202 |

OTHER PUBLICATIONS

Coutaz-Raymond, J. et al., "ADELE and the Compositor-Mediator or How to make an Interactive Applications Program Independent of the User Interface", *Software Engineering: Practice and Experience*, Jun. 1984, 78-86.
Shneiderman, B. et al., "Display Strategies for Program Browsing: Concepts and Experiment", *IEEE Software*, 1986, 3(3), 7-15.
Yip, S.W.L. et al., "Graphical User Interfaces Validation: A Problem Analysis and a Strategy to Solution", *Proc. of the 24th Annual Hawaii Intl. Conference*, 1991, 2, 91-100.

* cited by examiner

*Primary Examiner*—Andy Ho
(74) *Attorney, Agent, or Firm*—Woodcock Washburn LLP (57) ABSTRACT

An API and method for processing a user interface event is provided. The user interface event may take place in any environment of a software application, and may result from any type of user or software action. An embodiment also provides a framework for customizing the processing of a user interface event without the need to maintain accountability of computer states. In the method, an application process user interface event is processed using an operating system process. A user interface event is received by the application process by way of a user interface. A software component adapted to process the user interface event is pushed onto a memory stack by the operating system process. The operating system process processes the user interface event using the software component, and pops the software component from the memory stack.

30 Claims, 6 Drawing Sheets

CONFIGURABLE EVENT HANDLING FOR AN INTERACTIVE DESIGN ENVIRONMENT

CROSS-REFERENCE TO RELATED APPLICATION

This application is a continuation-in-part and claims priority under 35 U.S.C. § 120 to co-pending U.S. patent application Ser. No. 10/400,366, filed Mar. 27, 2003, the disclosure of which is herein incorporated by reference in its entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

The present invention relates to computer user interfaces. More particularly, the present invention relates to an Application programming interface (API) for handling user input events that take place in an interactive design environment. Even more particularly, the present invention relates to such APIs that use a memory stack to implement software components that handle user input events.

BACKGROUND OF THE INVENTION

In computing environments, a user interface (UI) typically allows a user to interact with objects displayed on a display device by using an input device. For example, a user may use a mouse to direct selection indicia, such as a pointer, to an object on a monitor screen, and then may "click" on the object to select the object or to perform a function on the object. Such a function is typically defined and controlled by the software that is generating the particular UI, or by software that is running transparently to generate the functionality while other software, such as the computer operating system, generates the UI. Sometimes a function that may be performed by the user is defined by the area that is selected, or by the area over which the pointer is placed prior to selection. In other instances, the functions that may be performed are contextual, where a function is made available to a user based on what task is being performed, or by the component of the software that is currently being used. In still other instances, a combination of context and user selection determines an available function.

Because of the context- and user-based nature of computing environments, a computer user may use the same pointer to perform a multitude of tasks. For example, a pointer may enable a default function, such as the ability to select objects on a display device, but when the pointer is placed on the edge of an object it may offer a different function, such as a resizing function. When the user moves the pointer off the edge, the pointer may then revert to its default function.

As a more detailed example, a user may direct a selection pointer to an object and then may select the object. In many computer systems, such a selection may be accomplished by moving a mouse to position the pointer over the desired object, and then by pressing a button on the mouse ("mouse down") to select the object. Now that the object has been selected, the software may associate this UI event—where the user has placed the pointer over an object and then pressed a button—with a desire to move the object to another location. Such an association is typically referred to as a component—where a UI event defines a function that the software will perform. Accordingly, the software may enable a relocation function, where the user may move the mouse while holding down the button to move the object to another location on the display device. Upon reaching the desired location, the user may release the button ("mouse up") to fix the object to its new location. Upon completing the movement, the pointer may revert to being a selection pointer, or it may allow the user to perform another function.

As discussed above, the functions performed by the software are typically activated by events initiated by components, such as a component associated with the aforementioned combination of a mouse movement and button click. Correspondingly, for a given component, user actions typically have a fixed meaning. Therefore, a combination of a component and a UI event can be associated with a "handler," which is a piece of software code activated by the event. The handler contains computer-readable instructions enabling the computer to carry out the necessary functionality.

As discussed briefly above, the context in which the UI event occurs may affect which software function is performed, and which handler is activated. For example, in a design environment, such as an editing mode for permitting user interaction with an electronic document, the meaning of a given UI event may vary greatly. The meaning may depend on a particular editing mode in which the software is currently operating, the editing operation currently being performed, the software tool that is currently active, and the like. For example, in a software application having a graphical image of a button on a display device, such as a "print" button in a word processor, the UI event of a mouse click on the button could mean different things depending on the context in which the UI event takes place. For example, it could mean the selection of the button to cause a document to print, the start of a movement of the selected button to another location on the display device, or the activation of text editing in the button's label. In each case, the software may be operating in a different editing mode, such as a general document editing mode, a button relocation mode or a button editing mode, respectively.

Because of the variety of editing operations that may be performed for a given UI event, therefore, UI event processing in an editing environment cannot be tied to particular components or software applications. Instead, UI event processing should be handled by a special editing framework. In conventional systems, such a framework involves a systematic means for keeping track of the particular state in which a program is operating. Using the object relocation example given above, a state machine or the like typically performs such a function.

A state machine in such a conventional system keeps track of all the possible previous and next states in which the software may operate. For example, when in a general editing state, the state machine would permit a user to enter into a second state when the user positions the pointer over an object with which it can interact. Once in the second state, the state machine would permit the user to revert to the previous general editing state, which could occur if the user repositioned the pointer over empty space. Alternatively, the state machine could permit the user to enter a third state, which could occur if the user moused down on the object. There may be a plurality of states into which the user may enter at any point.

For example, while in the second state, the user may be able to enter any one of several states—such as a third, fourth, fifth or sixth state—depending on the UI event initiated by the user.

As may be appreciated, any software having a rich set of functionality will have a large and complex arrangement of possible states. In addition, the states must be accounted for with perfect accuracy, otherwise inconsistent results or program failure may occur. For example, if the states are not kept perfectly consistent, the same UI event in the same editing mode may yield a different software operation for a given UI event, or may cause the program to crash by causing the state machine to enter into an inconsistent or unplanned-for state.

In many applications, a user such as a programmer or system administrator may wish to customize the software to add functionality to a program that was not originally part of such program. For example, a user with specific requirements may wish to provide an added or different function from the default function when a pointer is moved to an object. Accommodating such a customization adds a requirement to the software to enable UI event handling to be customizable, so that custom tools can be integrated into the software.

One shortcoming of conventional software is that incorporating added functionality into the software can be extremely difficult and complex. For example, in the software discussed above, a user wishing to modify the software would need perfect knowledge of each state used by the software, so a new function could be added to the UI event handling system without causing an illegal function or software crash. If the software has rich functionality, as discussed above, the complexity of the accounting for each of the existing states may cause such a modification to be unduly difficult. In fact, the task is so complicated in conventional software that in most situations, a programmer wishing to customize such conventional software will simply replace the entire UI event handling system rather than attempting to incorporate a new function. Such a replacement is an unnecessarily drastic procedure, particularly when the amount of desired customization is relatively small.

In addition, it is highly desirable that different software applications be able to use a common UI event handling system. A desirable UI event handling system should be able to communicate with a variety of software applications, determine the desired function and then communicate with various components and invoke function calls of the operating system to perform such functions.

What is needed, therefore, is an application programming interface (API) for providing extensible UI event handling in a software application. More particularly, what is needed is an API that enables an editing system to be customized with custom tools, custom types of editable objects, and the like. Even more particularly, what is needed is a software component that can process a user interface event according to the application context in which the event occurs.

SUMMARY OF THE INVENTION

In view of the foregoing, the present invention provides an API and method for processing a user interface event. The user interface event may take place in any environment of a software application, and may result from any type of user or software action. An embodiment also provides a framework for customizing the processing of a user interface event without the need to maintain accountability of computer states.

In the method, an application process user interface event is processed using an operating system process. A user interface event is received by the application process by way of a user interface. A software component adapted to process the user interface event is pushed onto a memory stack by the operating system process. The operating system process processes the user interface event using the software component, and pops the software component from the memory stack.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Overview

An embodiment of the present invention is directed to an extensible API that processes UI events. The API issues function calls to process UI events using software components that may be separated from the user actions that require their use. One or more of such components may be called and pushed onto a memory stack in any configuration desired. Additional components, such as a component to determine a function desired by a user based on a user action and application context, may be used to control the use of such components. One or more components may be active or suspended while on the memory stack, and may be terminated by being popped from the stack. An embodiment also enables customization of a UI event handling system by providing a means for maintaining accountability of components without the conventional need to monitor system states.

Exemplary Computing Environment

Figure 1:
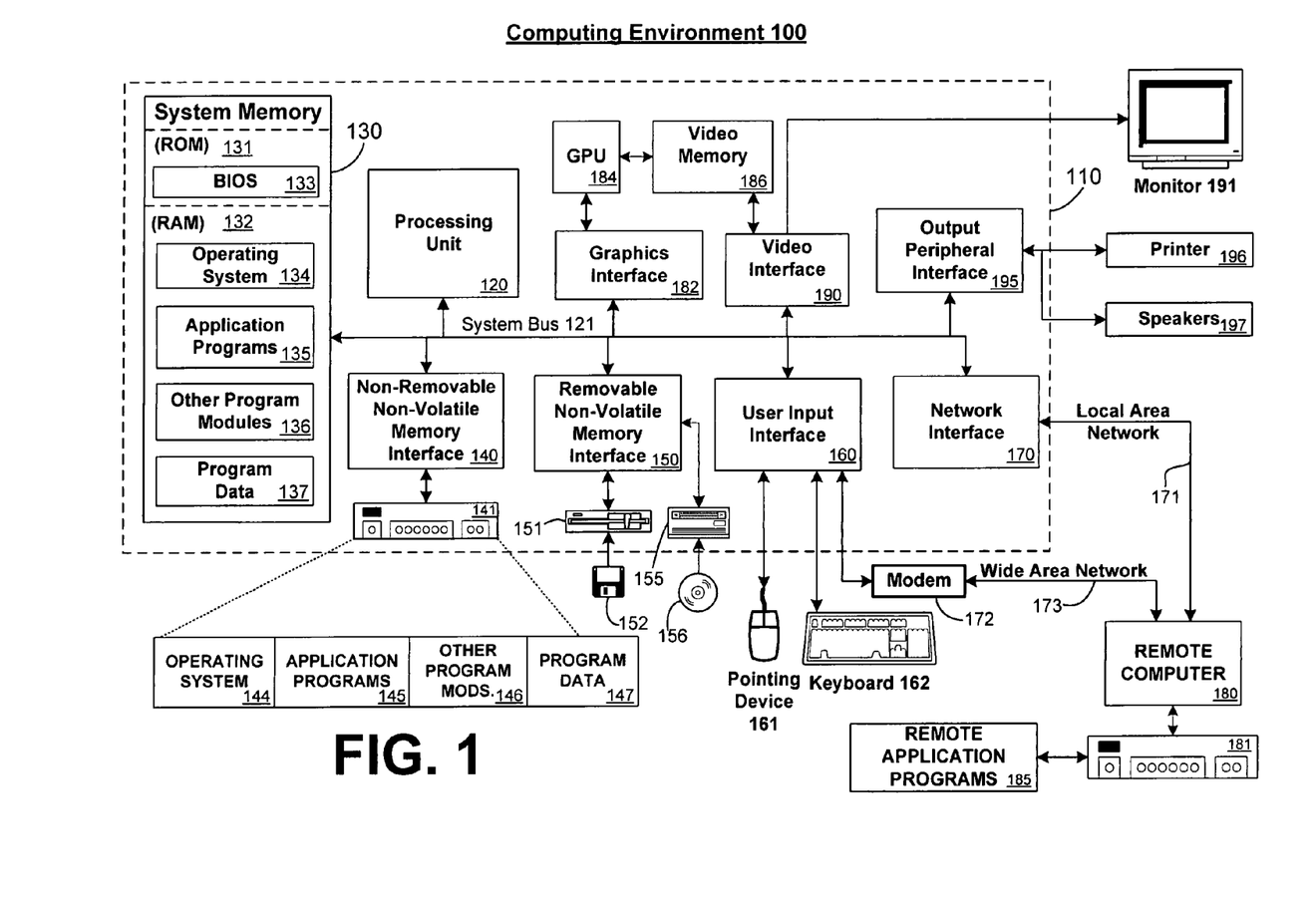
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any. method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of .NET's languages and services, and in other distributed computing frameworks as well.

Exemplary Embodiments

An embodiment relates to an API that handles an input event in the context of a software application editing or design environment. As should be known to those of skill in the art, an API is used by an application program to communicate with a computer's operating system or some other control program. An example of an input event that can be handled by an API according to an embodiment is a "zoom" tool. As the name implies, a zoom tool changes the scale of an object when viewed on a display device. Different ways of invoking a zoom tool while a user is operating in an application editing mode may exist in a software application. For example, a zoom tool may perform various tasks, such as: changing a zoom level for each click of a mouse wheel while a particular key is depressed, increasing a zoom level for each mouse click while ensuring that the point of the click stays within a visible frame, or decreasing a zoom level for each mouse click while a designated key (such as, for example, the "Alt" key) is held during a mouse down and drag, thereby allowing a user to select a rectangle to be enlarged to fit in the view.

In addition, different applications may have slightly varying programming conventions as to how a particular action, such as a zoom tool, may be activated. Nevertheless, the desired effect of the tool on the edited object is generally identical. Because of the various inputs that may invoke a tool, in one embodiment the component that enables the functionality of a tool is separate from any input event that may activate and control the tool. In such a manner, therefore, the API can recognize the functionality of a tool that should be invoked by any UI event using any programming convention. Accordingly, any editing tool may be implemented as an "edit behavior." An edit behavior is a software component that responds to UI events to provide editing functionality and describes the set of events in which it is interested. In an embodiment, the API activates the software components by, for example, issuing a function call to the operating system. Details of programming function calls, suitable edit behaviors, and other such software components should be known to one skilled in the art and are therefore not discussed in detail herein for clarity.

Figure 2A:
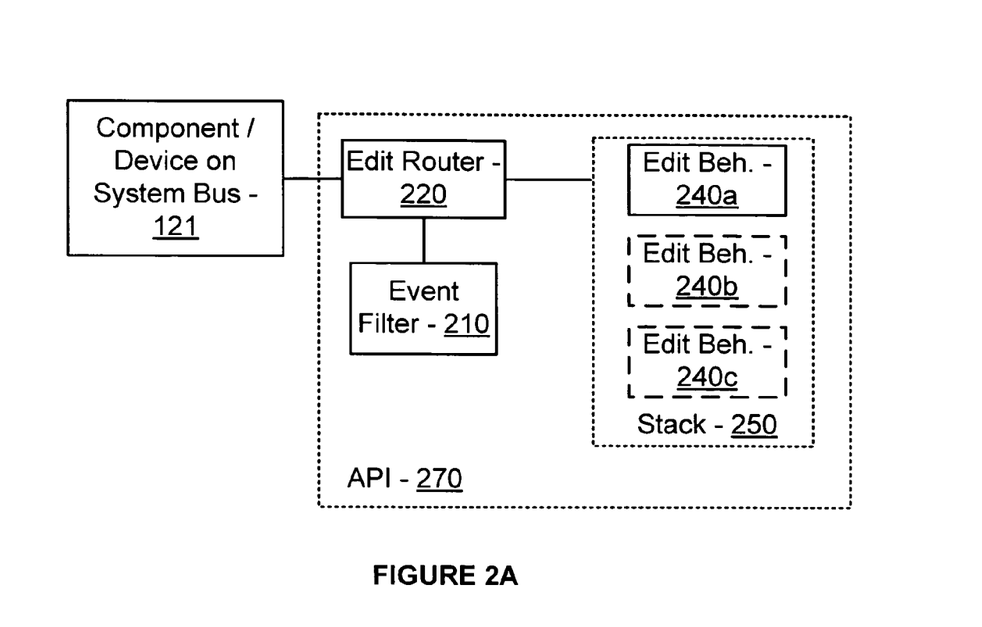
FIG. 2A is a functional diagram illustrating a relationship between an API and computer components that provide UI event handling in accordance with one embodiment of the present invention.
Figure 2B:
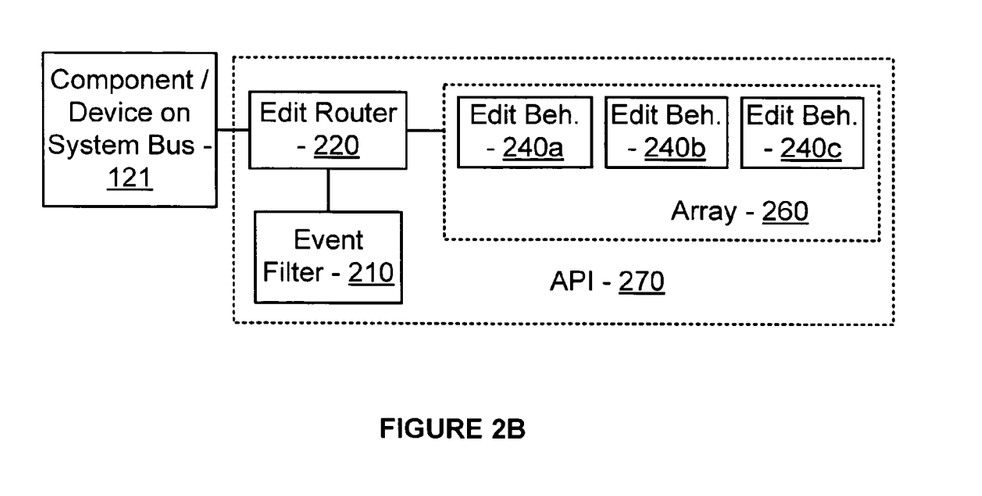
FIG. 2B is a functional diagram illustrating the relationship of FIG. 2A, and further illustrating edit behaviors arranged in an array in accordance with one embodiment of the present invention.
Figure 2C:
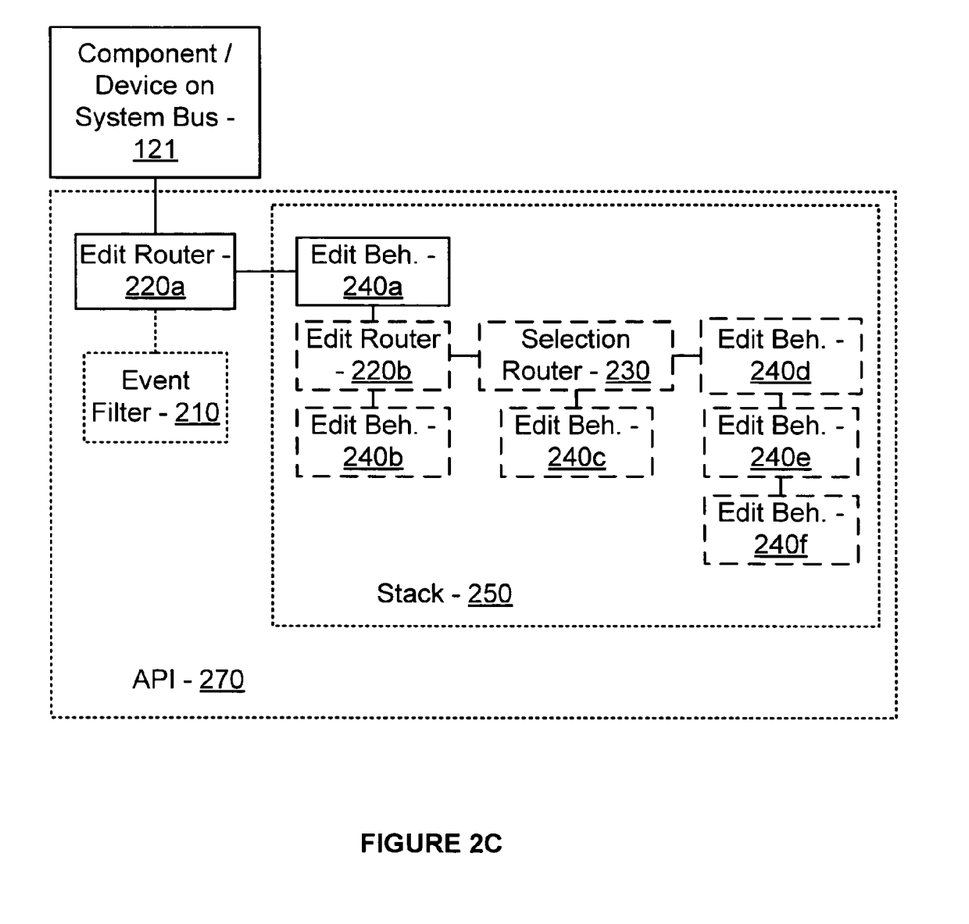
FIG. 2C is a funtional diagram illustrating the relationship of FIG. 2A, and further illustrating a nested relationship of edit routers in accordance with one embodiment of the present invention.

FIGS. 2A-C, below, illustrate an exemplary configuration of software components as may be implemented by an API according to one embodiment of the present invention. It will be appreciated, and as noted above, that the components used by the API in one embodiment are created by the API issuing function calls to the operating system, or some aspect thereof. An exemplary interface definition will be discussed below, and is provided in the Appendix.

Turning now to FIG. 2A, a device or component of computer 110 that is operatively connected to system bus 121 may be in operative communications with event filter 210 of API 270. API 270 is illustrated as a functional box, in which the software components (i.e., edit router 220, event filter 210, etc.) are located. This arrangement illustrates the functional relationship between the API, which issues function calls as necessary to invoke the software components to operate in the configuration and manner desired. It will be appreciated in the discussion that follows that references to the software components performing tasks is actually a shorthand for the API 270 issuing one or more function calls that perform the function(s) of the software component. The API 270 may then receive results and/or information relating to the function to issue one or more additional function calls. The memory stack 250, while located within API 270 in FIGS. 2A-C and 3, may be in any location that is operatively accessible to API 270.

Event filter 210 may be a software component that performs preliminary processing of UI events, a stand-alone program designed to handle such events or the like. Event filter 210 may receive UI events directly from user input interface 160 (not shown), edit router 220, or may receive such events from an intermediate component of computer 110. Event filter 210 may modify such UI events and/or route UI events to a proper software component for handling. For example, event filter 210 may make adjustments to the UI event to compensate for the aforementioned variances in program conventions, or the like. Event filter 210 may in turn be in operative communications with edit router 220, which in turn may be in operative communications with optional selection router 230. Furthermore, edit router 220 and/or selection router 230 may be in operative communications with user input interface 160 (not shown), an intermediate component of computer 110 or the like.

Edit router 220, selection router 230 or both may be in operative communications with edit behaviors 240a-c. While FIG. 2A illustrates three edit behaviors 240a-c, it may be appreciated that any number of edit behaviors 240 may be present. Edit router 220 may be a software component of a software application design environment capable of receiving UI events, either directly from user input interface 160, system bus 121, event filter 210 or the like, and routing such events to one or more edit behaviors 240. In one embodiment, edit router 220 has a set number of associated edit behaviors 240a-c to which edit router 220 may route a UI event for handling. For example, one edit router 220 may have edit behaviors 240a-c for performing a zoom, resize and scroll function, while another edit router may have edit behaviors 240 for performing other functions. As will be discussed below in connection with FIGS. 2A and 3, more complex arrangements of edit routers 220, edit behaviors 240a-c or the like are possible, thereby enabling the creation of enhanced editing functionality.

Selection router 230 may be a specialized edit router 220 that may be used in addition to or in place of edit router 220. Selection router 230 may be used to manage the editing selections available to a user based on the types of objects being edited or selected for editing. For example, different object types may require specialized code for editing, such as text, an image, a table or the like. In addition, the selection router 230 and event filter 210 may work in combination to determine an appropriate editing behavior based on the context of the UI event within the application. Thus, the event filter 210 determines the type of UI event that has occurred (e.g., mouse down, etc.), while the selection router 230 determines the type of environment in which the selection was made (e.g., editing mode, view mode, etc.). Combining the UI event type with the context (e.g., mouse down on a button while in an editing mode) enables the API 270 to determine the appropriate edit behavior(s) 240 to use to process the UI event.

Figure 5:
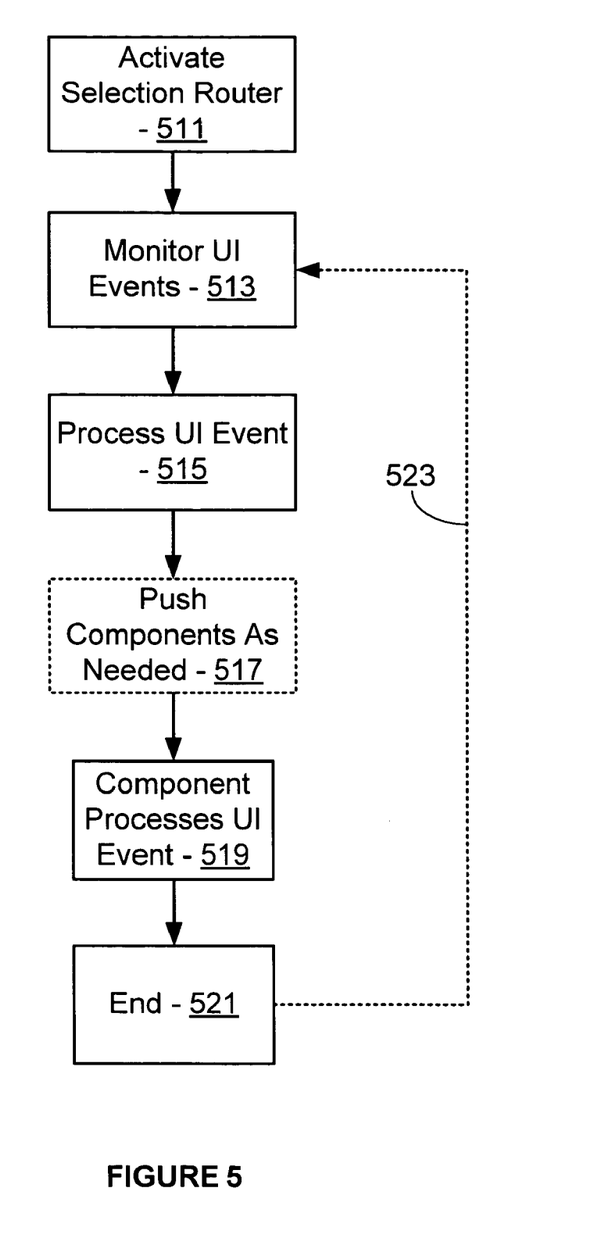
FIG. 5 is a flowchart illustrating an API-implemented method of monitoring and handling a UI event in accordance with one embodiment of the present invention.

One embodiment incorporating a selection router 230 will be discussed below in connection with FIG. 5. Similarly to edit router 220, the functionality of a tool is separate from any input event that may activate and control the tool. Accordingly, selection router 230 may enable flexible user selection of an object so, for example, a table cell when selected could be treated as text for commands such as Bold, or as a table for commands such as Column Width.

Figure 3:
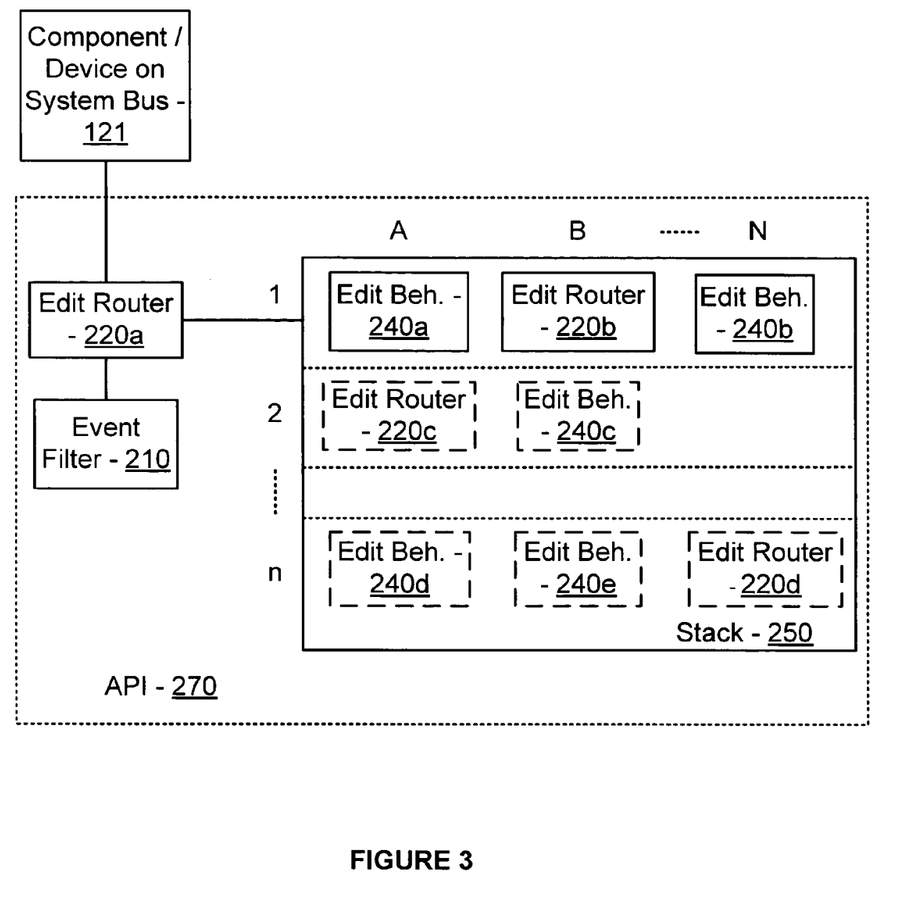
FIG. 3 is a functional diagram illustrating the relationship of FIG. 2A implemented in connection with a stack in accordance with one embodiment of the present invention.

As discussed above, edit behavior 240 may receive an input event from edit router 220. Although edit router 220 is shown in FIGS. 2A, 2B and 3, edit router 220 is not necessary for edit behavior 240 to receive input events. Edit behavior 240, for example, could monitor UI events directly, without the intervention of edit router 220. However, in one embodiment edit router 220 may be adapted to provide additional functionality to edit behavior 240, such as for example providing a uniform process for tool activation, a framework for cooperation between multiple tools or a means for customization of tool behavior.

Edit router 220 and event filter 210, in one embodiment, may interact to provide an organized means for processing a UI event. For example, edit router 220 may receive a UI event directly from system bus 121, user input interface 160 (not shown) or the like and may route the event to event filter 210. Edit router 220 may perform a function based on the event in conjunction with routing the event to event filter 210, such as calling an edit behavior 240, or may simply pass the event directly to event filter 210 without any such processing. Event filter 210 may then process the event by determining the type of event. For example, the event may be a zoom tool request, a text edit request or the like. Once the type of event is determined, event filter 210 may instruct edit router 220 to perform a task related to the event. For example, if the event is a zoom tool request, event filter 210 may instruct edit router 220 to call an appropriate edit behavior 240, such as a zoom tool edit behavior 240, to process the event. Upon completion of such processing, edit router 220 may communicate with event filter 210 that such processing is complete. Event filter 210 may then instruct edit router 220 to perform another task, if necessary. Another task may be necessary, for example, if the event requires multi-stage processing, an intervening event requires processing or the like. Alternatively, event filter 210 may not require edit router 220 to perform any further tasks until another event is detected.

In an embodiment, only one edit behavior 240 may be "active" at a given time. In other words, only one edit behavior 240 may be available to process a UI event. Alternatively, a plurality of edit behaviors 240 may be available simultaneously. A variety of factors may determine which edit behavior(s) 240 may be active, such as for example: which object is currently selected by a user, which editing mode is currently being used, default setting, a customized preference or the like. As will be discussed below in connection with FIG. 3, edit behaviors 240a-c may be active, suspended—meaning that such edit behavior 240 is available for use but is not currently being used, or terminated—where such edit behavior 240 is not available for use until it is invoked by a component, edit router 220, event filter 210 or the like.

Various additional components may also be added to, or may replace components in, the embodiment illustrated in FIG. 2A. For example, a possible additional or replacement component is a "selection," (not shown in FIG. 2A for clarity) which may be a component responsible for accounting for the objects selected by a user, as well as for providing visual feedback of an object's selection. Such feedback may be a sound, change in visual appearance of the object, or the like.

It will be appreciated that FIG. 2B illustrates the API 270 configuration of FIG. 2A, with the edit behaviors 240a-c arranged in an array 260 rather than in the stack 250 of FIG. 2A. Thus, it will be appreciated that the API 270 may interact with any type of memory that is configured in any fashion.

Referring now to FIG. 2C, the API 270 configuration of FIG. 2A is shown with a nested arrangement of edit routers 220a-c. To permit additional flexibility in the configuration and operation of editing tools, such as for example such tools that may be customized by a user, one or more edit routers 220 may be invoked by an edit behavior 240, edit router 220 or the like, which may result in the exemplary nested arrangement illustrated. In FIG. 2C, edit router 220a is associated with edit behaviors 240a-c, while edit router 220b is associated with edit behaviors 240*d-e*, and likewise edit router 220*c* is associated with edit behaviors 240*f-g*. Optional selection router 230 may also be associated with one or more edit routers 220 and/or edit behaviors 240*a-g*, or the like.

In one embodiment, and as illustrated, event filter 210 may be operatively connected to edit router 220*a-c*. Alternatively, a separate event filter 210 may be operatively connected to each edit router 220*a-c*, or to one or more of several edit routers 220. Event filter 210 may review, and in some embodiments change, UI events before such events are processed by an edit behavior 240, and may also affect which edit behavior 240 may receive and process the UI event if more than one edit behavior 240 is active simultaneously. As noted above in connection with FIG. 2A, event filter 210 may perform the same functions for selection router 230. In an embodiment discussed above in connection with FIG. 2A, event filter 210 may receive a UI event from edit router 220*a*, and may then perform such review and processing. Event filter 210 may then instruct edit router 220*a* to process the event using a particular edit behavior 240*a-c*, or may instruct edit router 220*a* to call edit routers 220*b-c*, and corresponding edit behaviors 240*d-g*. Event filter 210 may also instruct edit router 220*a* as to which edit routers 220*a-c* or edit behaviors 240*a-g* should process the event.

Nesting edit routers 220*a-c* implemented by the API 270 may enable a software application, user or the like to, for example, customize an existing edit behavior 240, such as by adding an event filter 210 that terminates an active edit behavior 240 upon a user pressing a particular keyboard key. Nesting may also enable the construction of a tool having complex functionality from multiple edit behaviors 240. For example, a complex tool could be a combination of a primary tool, such as a "pen" or "brush" tool, with common help tools such as a scroll or zoom tool. In such a situation, a software application could create a user environment where, for example, a common tool is temporarily activated by pressing a designated key while a primary tool is still active, thereby obviating the need to suspend the primary tool. Nesting may further enable an application to arbitrate between multiple, similar edit behaviors 240 such as, for example, for managing selections of multiple types of objects.

Turning now to FIG. 3, and as noted above, memory stack 250 may be any location in system memory 130, non-volatile magnetic disk 152, non-volatile optical disk 156 or the like that is accessible to the API 270. One skilled in the art should be familiar with the operation of a memory stack 250, and so therefore a detailed explanation of the operation of such a stack 250 is omitted herein for clarity. As may be appreciated, therefore, the image of memory stack 250 in FIG. 3 is a functional illustration, and any implementation of such a stack 250 is consistent with an embodiment.

For ease of description, each position in stack 250 is labeled as follows: the first (top) row of entries is denoted by position 1, the second by 2, third by 3 and the last by the variable n. The variable n indicates that the number of rows of stack 250 may be of any size. The first (left) column of stack 250 is denoted by position A, the second by B and the last by the variable N. As is the case with the number of rows, stack 250 may contain any number of columns. As may be appreciated, therefore, the number of components, such as edit behaviors 240, edit routers 220 or the like, that may be pushed onto stack 250 may be unbounded. In addition, in an embodiment presented below, only components that are in row 1 may be active to receive or process UI events, while components in other rows are suspended. However, any row, column or location within stack 250 may be designated as an "active" area while still remaining consistent with an embodiment.

Memory stack 250 may be in operative communications with edit router 220*a*. Edit router 220*a* may in turn be operatively connected to edit behaviors 240*a-d* located in column A of stack 250. In one embodiment, related components, such as edit behavior 240*a-d*, are pushed onto stack 250 in the same column, such as column A. However, and as discussed above, any convention of pushing related components onto stack 250 is consistent with an embodiment. Edit router 220*a* may push edit behaviors 240*a-d* onto stack 250 when instructed to do so by event filter 210, in response to a UI event or the like. As in FIGS. 2A and 2B, event filter 210, and edit router 220 may be operatively connected to a component or device on system bus 121.

Edit behavior 240*a*, for example, may be activated by edit router 220*a* with a push operation, whereby edit behavior 240*a* is placed into row 1 of stack 250. Alternatively, edit router 220*a* may push several edit behaviors—such as for example edit behaviors 240*a-d*—onto stack 250, with one or more of edit behaviors 240*a-d* in row 1. As shown in FIG. 3, edit behavior 240*a* is active in row 1, while edit behaviors 240*b-d* are suspended in rows 2-n.

Edit router 220*b*, and its corresponding edit behaviors 240*e-f*, may be pushed onto stack 250, column B, by edit router 220*a*, edit behaviors 240*a-d*, at the direction of event filter 210 or the like. Edit behaviors 240*g-h* are shown in column N, and may be pushed onto stack 250 by any of edit router 220*a-b*, edit behaviors 240*a-f*, an intermediate component such as a selection router 230 (not shown) or the like. Although not shown in FIG. 3, one or more event filters 210 may also be pushed onto stack 250. As may be appreciated, any combination and number of components may be pushed onto stack 250. As may also be appreciated, the use of stack 250 to maintain control of components such as edit behavior 240 enable one or more edit behaviors 240 or the like to be added, deleted or modified without interfering with the overall operation of UI event processing. For example, a programmer or specialized user desiring to add an edit behavior 240 between edit behaviors 240*c-d* would need only add such an edit behavior 240 and possibly modify event filter 210, edit router 240 and/or the like to recognize that such edit behavior 240 may be called. Accordingly, the use or monitoring of states is not necessary to incorporate such edit behavior 240.

As an illustrative example of the use of stack 250, in one embodiment edit router 220*a* may push edit behaviors 240*a-d* onto stack 250 in response to a UI event, a direction from event filter 210 as in an embodiment discussed above in connection with FIGS. 2A and 2B, or the like. Edit behavior 240*a*, being in row 1, is active and may process a UI event. In the event that, for example, event filter 210 or the like determines that edit behavior 240*a* is no longer needed to process a UI event, edit behavior 240*a* may either be suspended or terminated. If suspended, edit behavior 240*a* may be pushed "down" a row to row 2, and another component, such as edit behavior 240*d*, may be pushed into row 1, thereby becoming an active edit behavior 240. Edit behaviors 240*b-c* may be pushed down one or more rows along with edit behavior 240*a*, pushed to another location on stack 250, popped from stack 250, or the like. If terminated, edit behavior 240*a* may be popped from stack 250 and edit behaviors 240*b-d* may be shifted up, thereby making edit behavior 240*b* an active edit behavior 240.

In one embodiment, a component in column A, or edit router 220*a*, event filter 210 or the like, may push one or more components onto stack 250. For example, active edit behavior 240*a* may be configured to require additional functionality that may be provided by edit router 220*b* and its associated edit behaviors 240*e-f*. Accordingly, edit behavior 240*a* pushes edit router 220b and edit behaviors 240e-f onto stack 250. Edit router 220b, being in row 1, is active along with edit behavior 240a, and therefore may also process a UI event. Furthermore, in one embodiment, a component in column B, or edit router 220a, event filter 210 or the like, may push one or more components onto stack 250. For example, edit router 220b may require functionality that is not provided by its associated edit behaviors 240e-f. Accordingly, edit router 220b may push edit behaviors 240g-h onto stack 250. Alternatively, and as in an embodiment discussed above in connection with FIGS. 2A and 2B, event filter 210 may instruct edit router 220a to push any of edit router 220b and/or edit behaviors 240a-h onto stack 250 at any point during processing of a UI event. Likewise, event filter 210 may instruct edit router 220a, or any component, to pop any of edit router 220b and/or edit behaviors 240a-h off stack 250. As may be appreciated, such a configuration permits multiple levels of processing for a UI input event.

Figure 4:
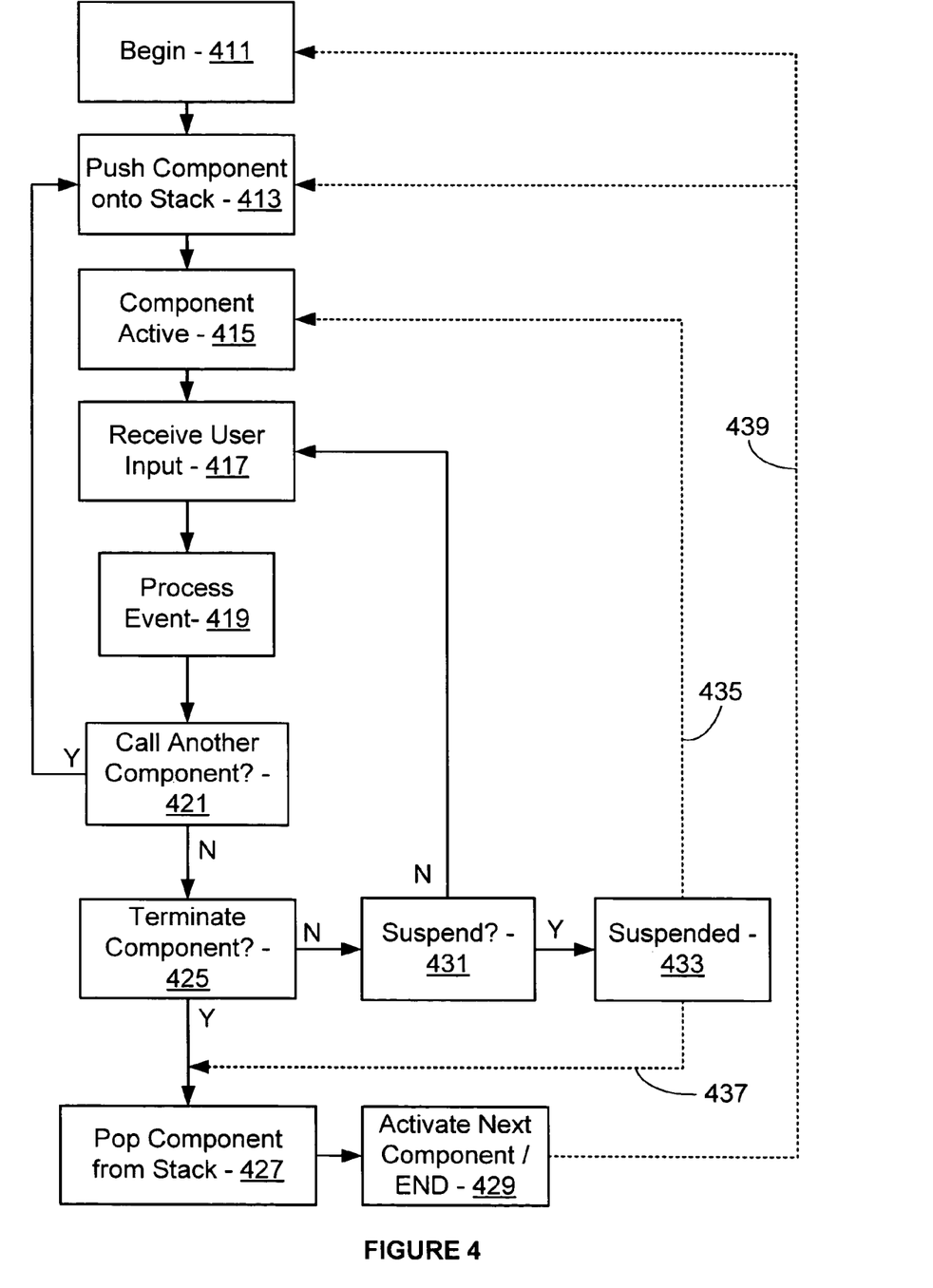
FIG. 4 is a flowchart illustrating an API-implemented method of handling a UI event in accordance with one embodiment of the present invention.

A method by which a computer 100 or the like may handle a UI event is illustrated with reference to FIG. 4. It will be appreciated in the discussion of FIG. 4 that the UI event is received in an application process, such as for example a word processor or the like. The API 270 enables communication between the application process and an operating system process that carries out the UI event handling. As was discussed above, the API 270 implements the components by way of function calls or the like.

At step 411, edit router 220 is called. As discussed above, any component, such as event filter 210, may call edit router 220 to begin the method. Edit router 220 may also handle a UT event by sending such event to event filter 210 for instructions as part of step 411, before actually being called by event filter 210 to process the event. Step 411 may take place at the very beginning of editing, or may take place after previous UI events have been handled by components such as edit behavior 240 or the like. At step 413, at least one edit behavior 240 is pushed onto stack 250. Step 413 may take place in response to event filter 210 instructing edit router 220 to push such edit behavior 240 onto stack 250, solely in response to edit router 220, or as will be discussed below in connection with step 421, from another edit behavior 240. As was discussed above in connection with FIG. 3, at least one of the edit behaviors 240 that are pushed on stack 250 will be located in an active area, such as row 1. As may be appreciated, therefore, if any component, such as edit behavior 240, edit router 220 or the like, is already on the stack, such component may be popped from the stack, in which case the component has been terminated, or may be shifted down a row, in which case the component has been suspended.

At step 415, at least one edit behavior 240 becomes active and awaits a UI event to process according to the functionality it provides. Internal processes may occur to activate a component on stack 250 to enable such component to process a UT event. For example, if the component pushed onto stack 250 is actually several edit behaviors 240, then an internal method may be called on to perform an initialization of such edit behaviors 240.

At step 417, a UI event is received. As noted above, the UT event may be received by edit behavior 240 by way of event filter 210 and edit router 220, directly from user input interface 160, from event filter 210 or edit router 220 individually, or the like. At step 419, the UT event is processed according to the functionality of the edit behavior 240. As part of such functionality, and as will be discussed in connection with steps 421 and 423, event filter 210, edit router 220, edit behavior 240 or the like may call additional components. Edit behavior 240 may also, as part of processing the UI event, output a result or change to output peripheral interface 195, network interface 170, video interface 190 or the like. It will be appreciated that such outputting of a result or change, in one embodiment, is received from an operating system process by the API 270 and sent to an application process. At step 421, if one or more additional edit behaviors 240 are needed to process the UI event, then the method will proceed to step 413 for the called edit behaviors 240. The processing of the called edit behaviors 240 may take place concurrently with the processing of the calling edit behavior 240, consecutively or in any manner desired. As will be discussed below, the calling component may be terminated or suspended upon calling an additional edit behavior 240.

At step 423, if one or more additional edit routers 220 are called to process the UI event, then the method will proceed to step 411 for the called edit routers 220. As was the case with step 421, the processing of the called edit routers 220 may take place concurrently with the processing of the calling edit behavior 240, consecutively or in any manner desired. As may be appreciated, the one or more called edit routers 220 may each have one or more edit behaviors 240, which may be processed in the same manner as the calling edit behavior 240. At step 425, edit behavior 240 may be terminated if its functionality is no longer needed. If such is the case, the method proceeds to step 427. If edit behavior 240 is not to be terminated, then the method proceeds to step 431, where a suspend determination is made. If edit behavior is suspended, it enters a suspend state at step 433. A suspend or terminate determination may be made in response to a particular UI event, such as for example a mouse button up, depressing of a particular key or the like. Alternatively, an external operation such as, for example, a tool change or the like may initiate such a determination.

As discussed above in connection with FIG. 3, such a suspend state may occur when edit behavior 240 is shifted down one or more rows in stack 250. Edit behavior 240 may reside in a suspended state until such edit behavior 240 is re-activated—such as for example by being pushed back to row 1 of stack 250 in FIG. 3—or terminated at step 427. At step 427, edit behavior 240 is terminated by being popped from stack 250. Edit behavior 240 may initiate its own termination, or such termination may be initiated by edit router 220, selection router 230, event filter 210 or the like.

At step 429, the process may end, if no further edit operations are to take place, or a next edit behavior 240 may become active if the process is to continue. For example, if the currently running edit behavior 240 is to terminate, but another edit behavior is to become active, then the currently running edit behavior may be popped from stack 250 at step 427, and then at step 429 the process may, as indicated by line 435, return to steps 411 or 413. As may be appreciated, the design of event filters 210, edit routers 220 and edit behaviors 240 may change the exact timing, sequence, number of steps and the like of the method described herein in connection with FIG. 4. For example, edit behavior 240 may process a UI event and then may be terminated at step 425, 427 without proceeding to steps 421, 423, 431 or 433.

As discussed above in connection with FIGS. 2A-C, many types of components are available to the API 270 according to an embodiment. One such component is selection router 230. Turning now to FIG. 5, selection router 230 is activated at step 511. Step 511 may take place, for example, when event filter 210 instructs edit router 220 to push selection router 230 onto stack 250, or selection router 230 may be running concurrently or in place of event filter 210. If selection router is pushed onto stack 250, it may be placed in an active area of stack 250, such as row 1 of stack 250 as illustrated in FIG. 3.

At step 513, selection router 230 monitors for UI events that may activate a selection process such as, for example, a mouse move, mouse down, keyboard focus change or the like. During step 513, selection router 230 may optionally have one or more edit routers 220 and/or edit behaviors 240 active or suspended on stack 250. For example, an edit router 220 having edit behaviors 240 that are most applicable to the likely UI events that may be monitored by selection router 230 may be in place on stack 250 to enable a faster or more comprehensive response. In fact, one or more edit routers 220 and/or edit behaviors 240 may even be pushed onto stack 250 before or at the same time selection router 230 is activated at step 511.

At step 515, selection router 230 processes one or more UI events. In doing so, selection router 230 may optionally work in conjunction with event filter 210. In fact, selection router 230 may incorporate the functionality of event filter 210, so that selection router 230 may perform the tasks normally associated with event filter 210, without having event filter 210 as a separate component. Assuming that the selection router 230 and event filter 210 are separate, the selection router 230 determines the type of environment in which the UI event occurred. For example, the UI event may have taken place in an editing environment, a viewing environment, or the like. The event filter 210 determines the type of UI event that took place, such as for example a mouse down, double-click, etc. The API 270 combines this information to determine one or more appropriate components that should process the UI event.

The selection router 230 may pass the UI event to an appropriate component for processing at step 519. If no appropriate components are active or present on stack 250, then selection router 230 may proceed to optional step 517 to push the desired components on to stack 250. As may be appreciated, a component may be chosen by selection router 230 to process a UI event according to any criteria, such as for example event kind, presenter type, potential element type, current state (such as in-place active) or the like. Also, selection router 230 may push a component onto stack 250 itself, or may instruct another component, such as edit router 220, to do so. In an embodiment, API 270 issues function calls or the like as needed to carry out such component-pushing activities.

At step 519, the appropriate component(s) such as edit router 220, edit behavior 240 or the like processes the UI event as discussed above in connection with FIG. 4, step 419. After processing the UI event, the process may end at step 521. However, and as may be appreciated, such process may be ongoing, in which case selection router 230 may continue to monitor UI events at step 513, as indicated by optional arrow 523. If the process is to be terminated or suspended, such termination or suspension may take place as discussed above in connection with FIG. 3.

As may be appreciated from the preceding discussion, having selection router 230 be responsible for UI selection bookkeeping and edit routers 220 and edit behaviors 240 for handling UI input events, enables one to extend each independently. Therefore, updating or customization of an individual feature such as, for example, a zoom tool as carried out by edit behavior 240, may be updated without interfering with the criteria for selecting such tool because the corresponding selection router 230 or edit router 220 will remain unaffected. Accordingly, and as discussed above in connection with FIG. 3, changes of any size, even as minor as a single change to an individual component, may be made without the necessity of maintaining perfect accountability of states.

As has been noted throughout the above discussion, UI event handling can be implemented using an API 270. An exemplary interface definition of such an API 270 is included in the Appendix. As was also noted above, the API 270 may issue function calls or the like to an operating system, subsystem or the like to carry out the functionality of the components described herein. Referring now to the Appendix, it can be seen that certain instructions are labeled "public," while others are "protected." The public instructions may be called by either internal or external code. In contrast, the protected instructions may only be called by internal code, or by an implementation of the correct class. In addition, other controls may put in place by the API 270. For example, in one embodiment, an edit behavior 240 can only be called by an edit router 220. Such a control may be in place because allowing other components to call an edit behavior may cause stability issues.

An inspection of the exemplary interface definition as included in the Appendix shows sections pertaining to the implementation of edit routers 220, event filters 210, edit behaviors 240, selection routers 230 and so forth. As the interface definition of the Appendix is only exemplary, it will be appreciated that the syntax exhibited therein is not essential to an embodiment. Thus, any syntax used to create an interface definition of an API 270 is equally consistent with an embodiment.

While the present invention has been described in connection with the embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any configuration of components in any type of application environment. Therefore, the present invention should not be limited to any single embodiment, but rather should be construed in breadth and scope in accordance with the appended claims.

APPENDIX

The interface definition that follows below provides an exemplary API according to one embodiment of the present invention.

```
[presentationframework]
namespace MSAvalon.Windows.Design
{
    [StructLayoutAttribute(..)]
    public class ActivationEventFilter: EventFilter
    {
```

-continued

```
            public ActivationEventFilter( );
            protected override void OnAttach(EditRouter router);
            protected override bool OnHandleGenericEvent(object sender, RoutedEventArgs
args);
        }
        [StructLayoutAttribute(..)]
        public abstract class EditBehavior: IService
        {
            protected EditBehavior( );
            public virtual Type AdornerSetType { get; }
            public DependencyObject BehaviorScope { get; }
            public bool IsSuspended { get; }
            public virtual Type ServiceType { get; }
            public virtual object GetAdornerSet( );
            protected ICollection GetFilteredSelectedComponents( );
            protected InputManager GetInputManager( );
            protected MouseDevice GetPointer( );
            protected ICollection GetSelectedComponents( );
            protected object GetService(Type serviceType);
            protected object GetService(Type serviceType, DependencyObject scope);
            protected virtual void OnAttach(DependencyObject scope, EditRouter router);
            protected virtual void OnCancel( );
            protected virtual void OnDetach( );
            protected virtual void OnResume( );
            protected virtual void OnSuspend( );
        }
        [StructLayoutAttribute(..)]
        public abstract class Editor: EditBehavior, IService
        {
            protected Editor( );
            public abstract ISelection Selection { get; }
            public abstract Type SelectionType { get; }
        }
        [AttributeUsageAttribute(..)]
        [StructLayoutAttribute(..)]
        public sealed class EditorTypeAttribute: Attribute
        {
            public EditorTypeAttribute(Type type);
            public Type EditorType { get; set; }
        }
        [StructLayoutAttribute(..)]
        public class EditRouter: EditBehavior, IService
        {
            public EditRouter( );
            public EditRouter(DependencyObject scope);
            public EditRouter(DependencyObject scope, EventFilter eventFilter);
            public EditRouter(EventFilter eventFilter);
            public int ActiveBehaviorCount { get; }
            public EventFilter EventFilter { get; }
            public bool ForwardingEvents { get; }
            public int StackDepth { get; }
            public void Add(EditBehavior editBehavior);
            public void AddHandler(EditBehavior behavior, DependencyObject scope,
RoutedEventID routedEvent, Delegate handler);
            public void ForwardEvents(EditRouter forwardTo);
            protected override void OnAttach(DependencyObject scope, EditRouter router);
            protected override void OnDetach( );
            protected override void OnResume( );
            protected override void OnSuspend( );
            public IList Peek( );
            public void Pop( );
            public void Push(DependencyObject scope);
            public void Push(DependencyObject scope, EditBehavior editBehavior);
            public void Push(DependencyObject scope, Type behaviorType);
            public void Remove(EditBehavior editBehavior);
            public void RemoveHandler(EditBehavior behavior, DependencyObject scope,
RoutedEventID routedEvent, Delegate handler);
            public void Replace(DependencyObject scope, EditBehavior editBehavior);
            public void Replace(DependencyObject scope, Type behaviorType);
            public void Resume( );
            protected void SetEventFilter(EventFilter eventFilter);
            public void Suspend( );
            public event EventHandler Changed;
        }
        [SerializableAttribute(..)]
        [StructLayoutAttribute(..)]
        public enum EditRouterChange
        {
            Add,
            Pop,
```

```
        Push,
        Remove,
    }
    [StructLayoutAttribute(..)]
    public class EditRouterChangedEventArgs: EventArgs
    {
        public EditRouterChange Action { get; }
        public EditBehavior Behavior { get; }
    }
    [StructLayoutAttribute(..)]
    public abstract class EventFilter
    {
        protected EventFilter( );
        protected virtual void OnAttach(EditRouter router);
        protected virtual void OnBehaviorPopped( );
        protected virtual void OnBehaviorPushed( );
        protected virtual void OnDetach( );
        protected virtual ICollection OnGetBehaviorRoute(object sender, RoutedEventArgs
args, IList behaviors);
        protected virtual bool OnHandleGenericEvent(object sender, RoutedEventArgs
args);
    }
    [StructLayoutAttribute(..)]
    public class RoutedEventAdapter
    {
        public static Delegate CreateAdapter(Type handlerType, RoutedEventHandler
genericHandler);
    }
    [StructLayoutAttribute(..)]
    public class SelectionRouter: EditRouter, IService
    {
        public SelectionRouter( );
        public static readonly DependencyProperty ServiceDependencyID;
        public Editor EnsureEditor(DependencyObject scope);
        public Editor EnsureEditor(Type selType);
        public Editor EnsureEditorRegistration(Type selType);
        protected override void OnAttach(DependencyObject scope, EditRouter
containingRouter);
        protected override void OnDetach( );
        protected override void OnResume( );
        protected override void OnSuspend( );
    }
    [StructLayoutAttribute(..)]
    public class TextEditor: EditBehavior, IService
    {
        public TextEditor(TextArray textArray, TextRangeMovable editRange);
        public bool AcceptsReturn { get; set; }
        public bool AcceptsTab { get; set; }
        public bool IsReadOnly { get; set; }
        public TextSelection Selection { get; }
        protected override void OnAttach(DependencyObject scope, EditRouter router);
        protected override void OnCancel( );
        protected override void OnDetach( );
        protected override void OnResume( );
        protected override void OnSuspend( );
    }
    [EditorTypeAttribute(..)]
    [XamlDesignerSerializerAttribute(..)]
    [StructLayoutAttribute(..)]
    public sealed class TextSelection: TextRange, IEnumerable, IFrameworkInputElement,
ILoaded, ILogicalTreeNode
    {
        public static readonly DependencyProperty AtomicProperty;
        public TextPosition ActiveEnd { get; }
        public bool IsCaretVisible { get; }
        public override void Append(FrameworkContentElement element);
        public override void Append(string text);
        public override void Append(UIElement element);
        public void BeginMoveSequence( );
        public override bool CanChangeText(TextChangeOptions change);
        public override TextRange Copy(ObjectCloneDelegate clone);
        public override TextRange Cut( );
        public override void Delete( );
        public void EndMoveSequence( );
        public override IEnumerator GetContentEnumerator( );
        public override IEnumerator GetEnumerator( );
        public void HideCaret( );
        public void InputText(string text);
        protected override void MakeUnmovable( );
        public TextRangeMovable MovableCopy( );
```

-continued

```
        public override void Move(ObjectCloneDelegate clone, TextPosition destination);
        public int Move(TextUnit unit, int count);
        public int Move(TextUnit unit, int count, TextMoveOptions options, TextPosition limit);
        public int MoveActiveEnd(TextUnit unit, int count);
        public int MoveActiveEnd(TextUnit unit, int count, TextMoveOptions options, TextPosition limit);
        public int MoveEnd(TextUnit unit, int count);
        public int MoveEnd(TextUnit unit, int count, TextMoveOptions options, TextPosition limit);
        public int MoveStart(TextUnit unit, int count);
        public int MoveStart(TextUnit unit, int count, TextMoveOptions options, TextPosition limit);
        public void MoveTo(TextPosition position);
        public void MoveTo(TextRange range);
        public override void Paste(TextRange from);
        public void SetActiveEnd(TextPosition position);
        public void SetEnd(TextPosition position);
        public void SetStart(TextPosition position);
        public void ShowCaret( );
        public override TextRange UnmovableCopy( );
        public override void Unposition( );
        public event EventHandler Moved;
    }
}
```

What is claimed:

1. A method of processing an application process user interface event using an operating system process, comprising:

receiving, by the application process, a user interface event by way of a user interface;

pushing, by the operating system process, a software component adapted to process the user interface event onto a memory stack, wherein the pushing is accomplished via a call by an API to the operating system process;

processing, by the operating system process, the user interface event using the software component, wherein the processing is accomplished via a call by the API to the operating system process; and popping, by the operating system process, the software component from the memory stack, wherein the popping is accomplished via a call by the API to the operating system process.

2. The method of claim 1, further comprising receiving, by the application process, an application process context associated with the user interface event.

3. The method of claim 2, further comprising selecting, by the operating system process, the software component according to the application process context and the user interface event.

4. The method of claim 3, wherein the user interface event is a user action responsive to the application process.

5. The method of claim 1, wherein the user interface event is an editing command initiated in an editing mode of the application process.

6. The method of claim 1, wherein the user interface event is a selection of an object in an application process.

7. The method of claim 1, wherein the memory stack has a top memory location and wherein said software component is pushed, by the operating system process, onto the top of the memory stack, and wherein said processing takes place only if the component is at the top of the stack.

8. The method of claim 7, wherein the software component is a first software component, and wherein processing the user interface event comprises:

determining, by the operating system process, that a second software component is needed to process the user interface event;

pushing, by the operating system process, the second software component onto the top of the stack; and processing, by the operating system process, the user interface event using the second software component.

9. The method of claim 8, further comprising popping, by the operating system process, the first software component from the top of the stack.

10. The method of claim 1, further comprising outputting, by the application process, a result of said processing of said user interface event to an output device.

11. The method of claim 1, further comprising:

pushing, by the operating system process, a second software component adapted to process said user interface event onto the memory stack according to the software component;

processing, by the operating system process, the user interface event using the second software component; and popping, by the operating system process, the second software component from the memory stack.

12. The method of claim 11, further comprising suspending, by the operating system process, the software component upon pushing the second software component onto the memory stack.

13. A system for processing a user interface event, comprising:

a software component for processing the user interface event;

a memory stack for receiving the software component;

a set of executable instructions in communications with the memory stack, wherein the set of executable instructions is for pushing the software component onto the memory stack, processing the user interface event with the software component, and popping the software component from the memory stack and wherein the executable instructions are performed via a function call from an API; and an interface to the set of executable instructions for exposing the set of executable instructions to an application.

14. The system of claim 13, wherein said memory stack comprises an active region and a suspended region, and wherein said memory stack is adapted to permit said set of executable instructions to process the user interface event using said software component only if said software component is stored in the active region.

15. The system of claim 13, wherein the user interface event is a user action responsive to the application.

16. The system of claim 13, wherein the application has a context and wherein the software component processes the user interface event according to the context.

17. The system of claim 13, wherein the software component is a first software component, and wherein the set of executable instructions further determines that a second software component is needed to process the user interface event, pushes the second software component onto the memory stack, and processes the user interface event using the second software component.

18. The system of claim 17, wherein the set of executable instructions pops the second software component from the stack.

19. A computer-readable storage medium having computer-executable instructions stored thereon for performing a method of processing an application process user interface event using an operating system process, the method comprising:

receiving, by the application process, a user interface event by way of a user interface;

pushing, by the operating system process, a software component adapted to process the user interface event onto a memory stack, wherein the pushing is accomplished via a call by an API to the operating system process;

processing, by the operating system process, the user interface event using the software component, wherein the processing is accomplished via a call by the API to the operating system process; and popping, by the operating system process, the software component from the memory stack, wherein the popping is accomplished via a call by the API to the operating system process.

20. The computer-readable storage medium of claim 19, having further computer-readable instructions stored thereon for receiving, by the application process, an application process context associated with the user interface event.

21. The computer-readable storage medium of claim 20, having further computer-readable instructions stored thereon for selecting, by the operating system process, the software component according to the application process context and the user interface event.

22. The computer-readable storage medium of claim 21, wherein the user interface event is a user action responsive to the application process.

23. The computer-readable storage medium of claim 19, wherein the user interface event is an editing command initiated in an editing mode of the application process.

24. The computer-readable storage medium of claim 19, wherein the user interface event is a selection of an object in an application process.

25. The computer-readable storage medium of claim 19, wherein the memory stack has a top memory location and wherein said software component is pushed, by the operating system process, onto the top of the memory stack, and wherein said processing takes place only if the component is at the top of the stack.

26. The computer-readable storage medium of claim 25, wherein the software component is a first software component, and wherein processing the user interface event comprises:

determining, by the operating system process, that a second software component is needed to process the user interface event;

pushing, by the operating system process, the second software component onto the top of the stack; and processing, by the operating system process, the user interface event using the second software component.

27. The computer-readable storage medium of claim 26, having further computer-readable instructions stored thereon for popping, by the operating system process, the first software component from the top of the stack.

28. The computer-readable storage medium of claim 19, having further computer-readable instructions stored thereon for outputting, by the application process, a result of said processing of said user interface event to an output device.

29. The computer-readable storage medium of claim 19, having further computer-readable instructions stored thereon for:

pushing, by the operating system process, a second software component adapted to process said user interface event onto the memory stack according to the software component;

processing, by the operating system process, the user interface event using the second software component; and popping, by the operating system process, the second software component from the memory stack.

30. The computer-readable storage medium of claim 29, having further computer-readable instructions stored thereon for suspending, by the operating system process, the software component upon pushing the second software component onto the memory stack.

* * * * *

UNITED STATES PATENT AND TRADEMARK OFFICE
CERTIFICATE OF CORRECTION

| | |
|---|---|
| PATENT NO. | : 7,458,081 B2 |
| APPLICATION NO. | : 10/918170 |
| DATED | : November 25, 2008 |
| INVENTOR(S) | : Evgeny N. Veselov et al. |

Page 1 of 1

It is certified that error appears in the above-identified patent and that said Letters Patent is hereby corrected as shown below:

In column 4, line 27, delete "funtional" and insert -- functional --, therefor.

Signed and Sealed this
Twelfth Day of July, 2011

David J. Kappos
*Director of the United States Patent and Trademark Office*